(No Model.) 3 Sheets—Sheet 1.
A. L. BRUCE, G. STENHOUSE, W. McCOWAN & A. HADDOW.
Machinery or Apparatus for Treating Dextrine Maltose, &c.
No. 240,652. Patented April 26, 1881.
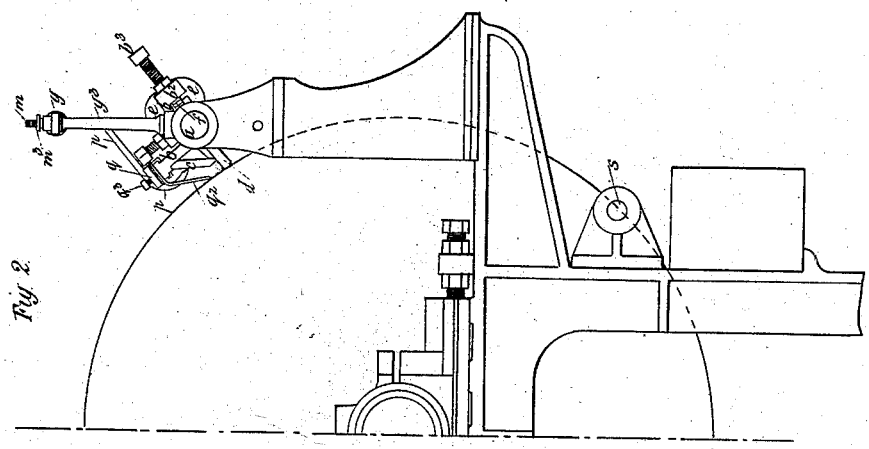
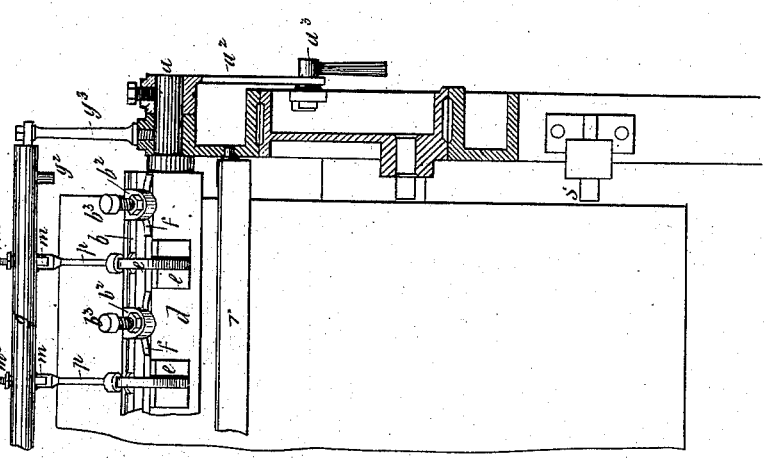
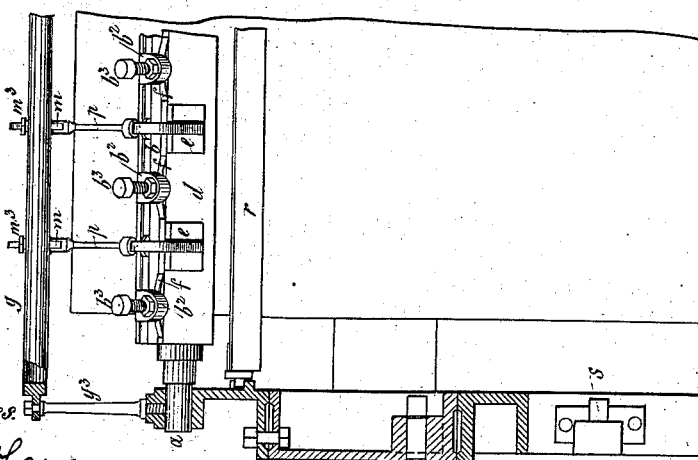
Witnesses.
Inventors.
A. L. Bruce
George Stenhouse
W. McCowan
A. Haddow
by Thos. Bailey
their attorney

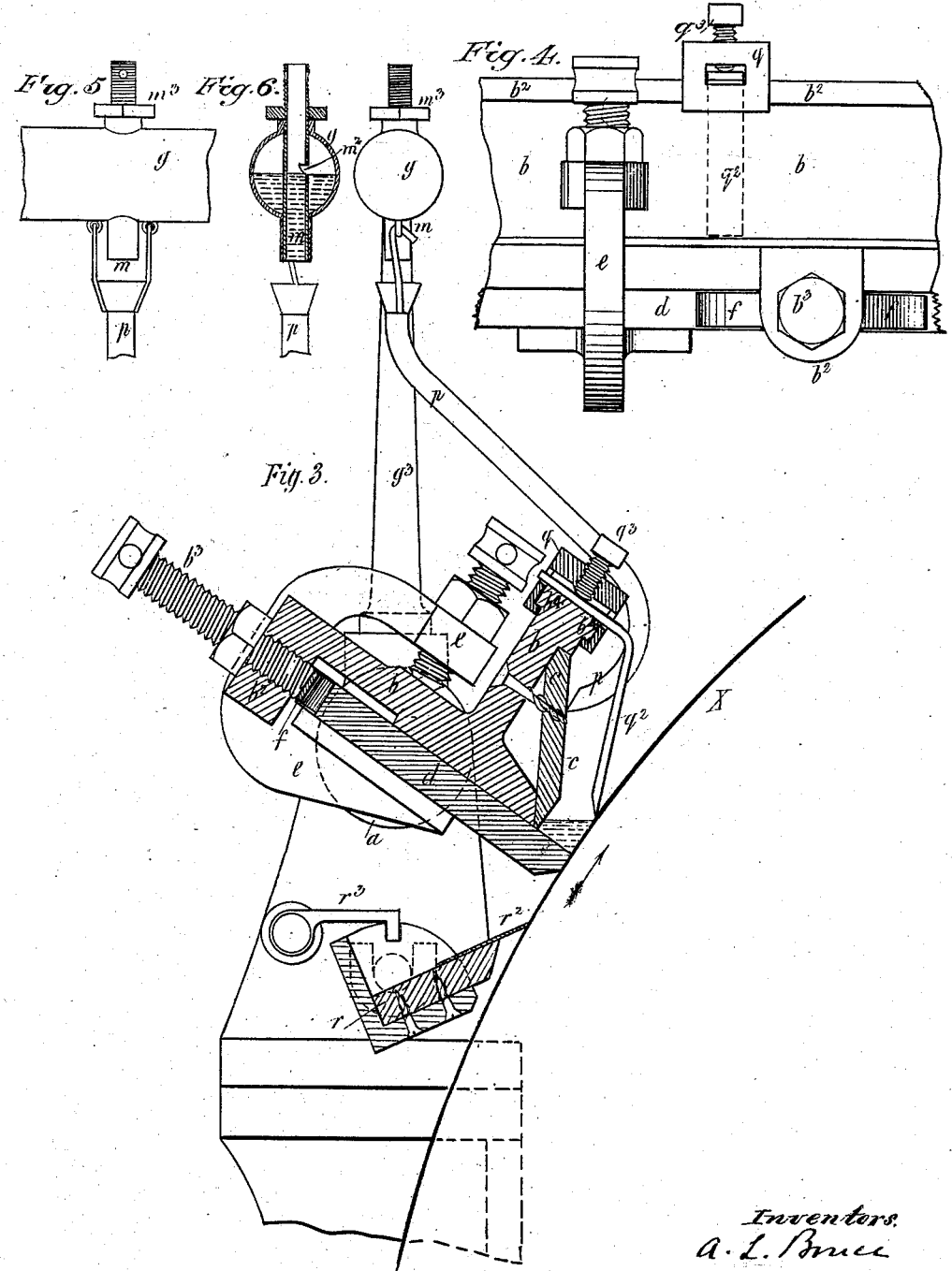

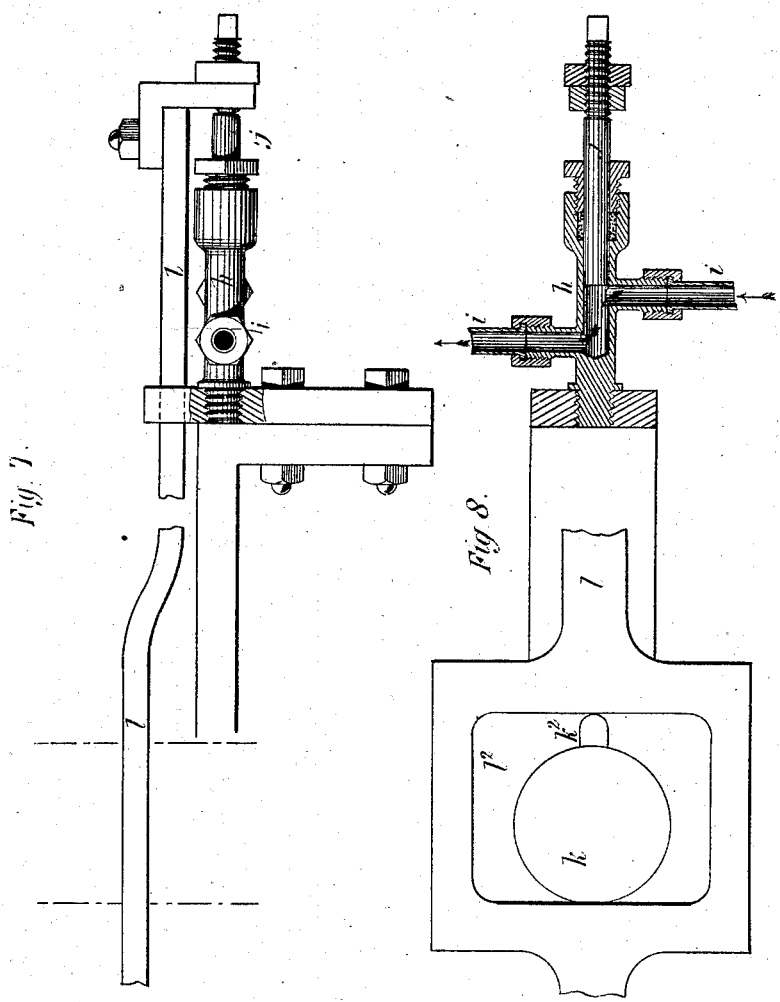

United States Patent Office.

ALEXANDER LOW BRUCE, GEORGE STENHOUSE, WILLIAM McCOWAN, AND ANDREW HADDOW, OF EDINBURGH, COUNTY OF EDINBURGH, NORTH BRITAIN, ASSIGNORS TO WILLIAM YOUNGER & CO., OF SAME PLACE.

MACHINERY OR APPARATUS FOR TREATING DEXTRINE MALTOSE, &c.

SPECIFICATION forming part of Letters Patent No. 240,652, dated April 26, 1881.

Application filed March 14, 1881. (No model.) Patented in England January 27, 1880.

*To all whom it may concern:*

Be it known that we, ALEXANDER LOW BRUCE, of the firm of William Younger & Co., brewers, GEORGE STENHOUSE, brewer to the said firm, WILLIAM McCOWAN, and ANDREW HADDOW, all of the city and county of Edinburgh, North Britain, have invented Improvements in Machinery or Apparatus for Treating Dextrine Maltose, Glucose, Malt-Worts, (hopped and unhopped,) and analogous substances, (for which we have received Letters Patent of the United Kingdom of Great Britain and Ireland, No. 366, dated the 27th day of January, 1880,) of which the following is a specification.

Our invention relates to certain improvements in machinery or apparatus for treating dextrine-maltose, glucose, malt-worts, (hopped and unhopped,) and analogous substances, and is a further development of the machinery or apparatus forming the subject-matter of our previous application for Letters Patent No. 3,230 of A. D. 1879.

The object of part of the present improvements is to dispense with the rotating brush and strikers, forming part of the aforesaid apparatus, for causing the matter under treatment to be projected in the form of spray upon the drying cylinder or cylinders. For this purpose, under our present improvements, we substitute for this said arrangement of rotating brush and strikers a trough or channel open at the ends, one side of the said trough or channel being formed by the periphery or drying-surface of the drying-cylinder, and the bottom of the said trough or channel being pressed against the said periphery, so as to prevent the matter to be treated and flowing into the said trough or channel from leaking out or passing through to its under side.

The dextrine maltose, or other matter to be treated, is supplied to the said trough or channel through supply and feeding pipes; and in order to prevent the said matter, or any small portions of solid matter which it may contain, from clogging the supply-pipe, (through which it passes to the feeding-pipe, from which it flows to the said trough or channel,) the said supply-pipe is provided with a piston or equivalent valve, which is operated at intervals to shut and open an orifice through which the said matter passes, so that the shock or interruption of the flow thus produced prevents the clogging or choking of the pipes. This piston or other valve is adjustable in order to regulate the quantity of matter passing to the trough or channel.

The feeding-pipe, into which the matter to be treated passes from the supply-pipe, is situated above the trough or channel, and the said feeding-pipe is provided with outflow-pipes, through which the matter flows in regulated quantity through suspended pipes whose lower ends open into the trough or channel. The said outflow-pipes pass through the upper and lower parts of the feeding-pipe, and they have an opening at that part of them which is in the said feeding-pipe, through which opening the matter to be treated passes into the said outflow-pipes. The upper parts of the said outflow-pipes are screwed and passed through a nut, by which the said overflow-pipes can be fixed in a higher or lower position, so that the said orifice therein can be adjusted to a correspondingly higher or lower position, and the rate of flow of the matter from the feeding-pipe to the trough be thereby regulated, and the delivery of the said matter from the said outflow-pipes along the whole length of the trough or channel be effected in equal quantities.

A scraper is provided, it being carried by a saddle capable of being slid longitudinally upon the framing of the trough and fixed in the position to which it is brought. The said scraper bears against the surface of the rotating cylinder just above the trough or channel, and its use is to prevent or remove any ridges of the material being dried thereon.

Figure 1 of the accompanying drawings represents, in front elevation, a portion of a cylinder provided with the improvements constituting our present invention. Fig. 2 is an end elevation of one-half of the said cylinder. Fig. 3 is a vertical section, drawn to a larger scale, of the trough or channel and other parts. Fig. 4 represents, in front elevation, a portion of the said trough; and Figs. 5 and 6 are, respectively, a front elevation of a portion of a feeding-pipe and a transverse section of the same. Figs. 7 and 8 are, respectively, a plan and vertical section of the arrangement for preventing the clogging of the matter in the supply and feeding pipes, and regulating the quantity of matter fed to the trough or channel.

The trough or channel is supported upon trunnions $a$ in the framing at either end of the drying-cylinder. The said trough or channel consists of a rib or casting, $b$, to which is fixed a strip of wood or other suitable material, $c$, extending therealong and forming one side of the said trough or channel. A strip, $d$, of wood or other suitable material, extends along the rib $b$, and is connected thereto by clamps $e$ placed at convenient or suitable distance apart. The other side of the said trough or channel is formed by the periphery or drying-surface of the revolving drying-cylinder, a portion of which surface is represented by the line X in Fig. 3, the said cylinder revolving in the direction of the arrow. At intervals on the rib $b$ are ears $b^2$, through which pass screws $b^3$, by which the bottom $d$ of the trough or channel is pressed into close contact with the surface of the cylinder, so as to prevent the liquid in the said trough from leaking out or flowing to its under side. The said trough is shown, for convenience of delineation, as being horizontal; but in practice it is slightly inclined, so that the matter to be treated may flow toward its lower end. Bow-springs $f$ are placed between the screws $b^3$ and the outer edge of the bottom $d$ of the trough or channel to give a yielding bearing of the inner edge of the said bottom $d$ against the cylinder.

Keyed to one of the trunnions $a$ is an arm, $a^2$, (see Fig. 1,) which is fixed against the framing of the machine by a clamping-screw, $a^3$, to retain the trough or channel in position against the side of the drying-cylinder, as shown in Fig. 3. By loosening this screw $a^3$ the said trough or channel can be turned back clear of the drying-cylinder for cleaning or other purposes.

The dextrine maltose, or other matter to be treated, is supplied to the machine by a pump, or by the action of gravity, or by other equivalent means, through a supply-pipe connected to the feeding-pipe $g$ at $g^2$, (see Fig. 1,) and in order to prevent the liquid or any small portions of solid matter which it may contain from clogging the pipes through which it flows, and to regulate the quantity of matter fed to the trough or channel, the said supply-pipe may be provided with the piston or valve arrangement, illustrated in plan and vertical section, respectively, in Figs. 7 and 8.

The valve-casing or cylinder $h$ is fixed to any convenient part of the machine and is provided with an inlet and an outlet passage, to which sections of the supply-pipe $i$ are connected, so that the matter passes through the said cylinder $h$ on its passage through the said supply-pipe, as indicated by the arrows. A piston or plunger, $j$, works backward and forward in the cylinder or casing $h$, this motion being effected in any suitable way—as, for example, by causing a projection, $k^2$, on the first-motion shaft $k$ of the machine to alternately knock against either side of a slot, $l^2$, in the rod $l$, to which the outer end of the piston or plunger $j$ is connected by a screw attachment, by which it may be adjusted, so that the said piston covers the inlet-passage of the supply-pipe to the cylinder $h$ for a greater or less portion of its stroke, by which adjustment the quantity of water fed to the trough or channel is regulated. When this valve is in operation the piston or plunger $j$ alternately covers and uncovers the inlet-passage, and the shock or interruption of the flow of the liquid thus produced prevents the pipes from becoming choked or clogged.

The feeding-pipe $g$ is supported by side standards, $g^3$, a short distance above the level of the trough or channel, and the matter to be treated flows from the supply-pipe $i$ into the said feeding-pipe at $g^2$, and therefrom through orifices in the outflow-pipes $m$, which are situated at intervals along the said feeding-pipe $g$. From the said outflow-pipes $m$ the said matter passes to the trough or channel through pipes $p$ suspended beneath the outlets of the said outflow-pipes $m$, as shown at Figs. 3 and 5. The outflow-pipes $m$ pass through the upper and lower sides of the main feeding-pipe $g$, and they have an orifice, $m^2$, (see Fig. 6,) through which the dextrine maltose or other matter passes from the feeding-pipe $g$. The said pipes $m$ are screwed at top and pass through nuts $m^3$ at the upper side of the feeding-pipe $g$, by which the said outflow-pipes $m$ can be raised or lowered, and consequently a greater or less quantity of matter be caused to pass through the orifices $m^2$ from the said feeding-pipe $g$, and thus the matter be equally distributed along the whole length of the trough or channel.

At the upper part of the rib $b$ is a bead, $b^4$, upon which a saddle, $q$, can be slid to and fro. The said saddle carries a scraper, $q^2$. The set-screw $q^3$ fixes the said saddle $q$ and scraper $q^2$ in the position to which they may be brought. The lower part of the said scraper $q^2$ bears against the surface of the rotating drying-cylinder, and its office is to prevent the formation of or remove any ridges of the material being dried which may form upon the surface of the said drying-cylinder, the said saddle and scraper being brought by hand into position to act upon the required portion of the cylinder's surface.

Supported in the frame-work of the machine is a drain-trough, formed by the trough-shaped rib $r$, carrying a strip, $r^2$, of steel or other material, held in position in contact with the cylinder by a catch or pawl, $r^3$, engaging in a notch in one of the end pieces which support the said rib, as seen in Fig. 3. This strip $r^2$ will intercept and cause to pass into the drain-trough any matter which may drop from the trough or channel above, as well as any overflow from the lower end of the said trough or channel. By turning back the catch or pawl $r^3$ the drain-trough may be turned back for cleaning or other purpose.

When the machine is in operation the valve or piston $j$, Figs. 7 and 8, and the orifices $m^2$ of the outflow-pipes $m$, are adjusted so as to cause a regulated quantity of matter to flow through the pipes $p$ to the trough or channel, where it will be taken up in a thin film or layer upon the surface of the drying-cylinder, and it will be dried thereupon, as described with regard to the drying in a thin film or layer upon drying-cylinders in our aforesaid former specification, it being understood that the arrangement of cylinders and the method of driving and heating them and supplying hot air to them are or may be the same as described in the said former specification.

It will also be understood that our present improvements may be applied to a machine having one drying-cylinder, or having more than one such cylinder, a trough or channel being provided for each cylinder.

The quantity of dextrine maltose or other matter will, by the adjustment of the valve, Figs. 7 and 8, be caused to pass in such quantity to the trough or channel that it will not accumulate to any considerable extent therein, but will at once be taken up upon the surface of the revolving drying-cylinder. When more is supplied than is taken up by the cylinder it overflows at the lower part of the trough or channel and is caught in the drain-trough $r$.

For removing the dried matter from the cylinder or cylinders any suitable scrapers may be employed; but we prefer to use the scrapers described and illustrated in the said specification of our said former patent. The centers at $s$ in Figs. 1 and 2 are for the reception of these scrapers.

We would observe, in conclusion, that we do not limit ourselves to the precise details herein described, and illustrated in the accompanying drawings, as the same may be varied without departing from the nature of our invention.

We claim—

1. The hereinbefore-described improvement in machinery or apparatus for drying dextrine maltose, glucose, malt worts, (hopped and unhopped,) and analogous substances, consisting in the combination with and use in such machinery or apparatus, of a trough or channel, or troughs or channels, for supplying the matter to be dried to the drying cylinder or cylinders, the said trough or channel, or troughs or channels, being constructed and arranged or combined essentially as hereinbefore described with reference to the accompanying drawings.

2. The arrangement, essentially as hereinbefore described with reference to Figs. 7 and 8 of the accompanying drawings, for causing an interruption of the flow of the matter passing to the cylinder or cylinders to be dried, for the purpose of preventing the clogging or choking of the supply-passages, and for regulating the supply of matter to the drying cylinder or cylinders.

3. The adjustable outflow-pipes $m$, constructed and combined with the feeding-pipe, essentially as hereinbefore described, and illustrated in the accompanying drawings, for the purpose of regulating the quantity of matter supplied through the whole length of the trough or channel, from which it is received upon the drying cylinder or cylinders.

4. The combination, with the machine, of the scraper $q^2$ and its connections, constructed and combined, as hereinbefore described, and illustrated in the accompanying drawings.

In testimony whereof we have signed our names to this specification in the presence of two subscribing witnesses.

ALEXANDER LOW BRUCE. [L. S.]
GEORGE STENHOUSE. [L. S.]
WILLIAM McCOWAN. [L. S.]
ANDREW HADDOW. [L. S.]

Witnesses:
GEORGE JAMES CUMMING,
  10 *Comely Green Place, Edinburgh.*
PETER PATON,
  42 *Canongate, Edinburgh.*